(12) United States Patent
Kim

(10) Patent No.: US 8,167,192 B1
(45) Date of Patent: May 1, 2012

(54) MANUFACTURING METHOD FOR CERAMIC HEATER

(75) Inventor: Hae Jin Kim, Seoul-si (KR)

(73) Assignee: GHD Korea, Inc., Chungcheongnam-Do (KR)

( * ) Notice: Subject to any disclaimer, the term of this patent is extended or adjusted under 35 U.S.C. 154(b) by 0 days.

(21) Appl. No.: 13/165,039

(22) Filed: Jun. 21, 2011

(30) Foreign Application Priority Data

May 16, 2011 (KR) .................. 10-2011-0045814

(51) Int. Cl.
*B23K 1/20* (2006.01)
*B23K 1/19* (2006.01)
(52) U.S. Cl. ............. 228/121; 228/120; 228/122.1; 228/123.1; 228/124.1; 428/1.62
(58) Field of Classification Search .......... 228/120, 228/121, 122.1, 123.1, 124.1; 438/1.62
See application file for complete search history.

(56) References Cited

U.S. PATENT DOCUMENTS 6,194,693 B1 * 2/2001 Shirai et al. ............. 219/552

* cited by examiner

*Primary Examiner* — Jessica L Ward
*Assistant Examiner* — Erin Saad
(74) *Attorney, Agent, or Firm* — Duane Morris LLP; J. Rodman Steele; Gregory M. Lefkowitz

(57) ABSTRACT

Disclosed herein is a manufacturing method for a ceramic heater. The manufacturing method includes the step of manufacturing a sintered ceramic substrate using a ceramic material and forming a conductive through hole in the ceramic substrate, the step of screen printing low temperature firing paste on the ceramic substrate, thus forming a heating wire, the step of screen printing Ag paste on the through hole, thus forming an electrode, the step of joining, using heat and pressure, a green sheet to a surface of the ceramic substrate on which the heating wire is formed, the step of firing the joined ceramic substrate and green sheet at low temperature, thus manufacturing a substrate body, and the step of brazing the lead wire to the electrode of the substrate body using filler metal while the lead wire is exposed to atmosphere.

9 Claims, 5 Drawing Sheets

MANUFACTURING METHOD FOR CERAMIC HEATER

CROSS-REFERENCE TO RELATED APPLICATIONS

This application claims priority of South Korean Patent Application No. KR 10-2011-0045814, filed May 16, 2011, the entire contents of which are incorporated herein by reference.

FIELD OF THE INVENTION

The present invention relates generally to a manufacturing method for a ceramic heater and, more particularly, to a manufacturing method for a ceramic heater, in which a heating wire capable of low temperature firing is printed on a sintered sheet, the sintered sheet is joined to a green sheet, and then the two joined sheets are fired at low temperature and a lead wire is brazed in the atmosphere.

BACKGROUND OF THE INVENTION

Description of the Related Art

Ceramics are normally non-metallic inorganic solid materials that are produced by sintering minerals at high temperature, and are superior to a metallic material or an organic material in terms of corrosion resistance, heat resistance, and abrasion resistance. Thus, ceramics are used as a heating medium for transferring high temperature heat from various heat sources to an object.

The following process is used to manufacture such a ceramic heater. As shown in FIGS. 1 to 3, a pair of upper and lower green sheets 50 and 52 which are thin are manufactured from a ceramic slurry containing ceramic material. Among the upper and lower green sheets 50 and 52, cut parts 50a are formed in an end of the upper green sheet 50 for the installation of lead wires 54.

Subsequently, a pattern for forming a heating wire 56 is screen printed on a surface of the lower green sheet 52 using a paste that is the mixture of tungsten (W) powder and high temperature glass powder. In this process, electrodes 58 are formed on the green sheet 52 located at a lower position to be coupled to the lead wires 54. Here, the heating wire 56 and the electrodes 58 are made of the same material. Each electrode 58 is formed to have an area larger than the heating wire 56, thus enabling the electrode 58 to be easily coupled to the lead wire 54.

Next, after the green sheets 50 and 52 have been joined together in a vertical direction, the green sheets 50 and 52 undergo a firing process at a high temperature of about 1400° C., thus finishing a sintered substrate body 60.

Afterwards, nickel electroless plating is performed on the surface of the electrode 58 of the sintered substrate body 60, and the lead wire 54 is coupled to the plated electrode 58 by brazing using a silver piece as filler metal. The brazing process for coupling the lead wire 54 is performed in a hydrogen furnace which is isolated from the contact with external air and is at a high temperature of about 950 to 1050° C. Particularly, in order to more efficiently limit contact with air throughout the entire duration of the brazing process, a mixture of hydrogen and water is continuously sprayed into the hydrogen furnace.

Manufacturing the ceramic heater through the above process is problematic in that the green sheet 50 having the cut parts 50a for the installation of the lead wires 54 and the green sheet 52 on which the heating wire 56 is printed are separately manufactured, are layered in a vertical direction, and then must undergo the firing process under a high temperature condition, so that a lot of expense is incurred when building related equipment.

Further, separate nickel electroless plating must be performed to braze the lead wires 54 to the electrodes 58 formed on the green sheet 52, and the mixture of hydrogen and water must be continuously sprayed onto the substrate body 60 so as to isolate the hydrogen furnace from contact with external air throughout the entire duration of the brazing process, so that the cost of manufacturing the ceramic heater is further increased.

Particularly, the nickel electroless plating which is performed to braze the lead wires 54 to the electrodes 58 formed on the green sheet 52 results in an additional process, so that it takes a long time to manufacture, it is very difficult to keep up with the production speed of related processes, and productivity is lowered for the whole manufacturing process.

SUMMARY OF THE INVENTION

Accordingly, the present invention has been made keeping in mind the above problems occurring in the prior art, and an object of the present invention is to provide a manufacturing method for a ceramic heater, in which a heating wire made of a rare-earth element for low temperature firing is printed on a substrate sintered using ceramic material, a green sheet is put into close contact with the substrate having the heating wire, the two joined sheets are sintered by low temperature firing, and a lead wire is brazed while being exposed to the atmosphere, thus allowing the ceramic heater with superior physical properties to be more easily manufactured.

In order to accomplish the above object, the present invention provides a manufacturing method for a ceramic heater, including manufacturing a sintered ceramic substrate into a proper size using a ceramic material and forming a through hole for power connection in the ceramic substrate; screen printing low temperature firing paste made of a rare-earth element on the ceramic substrate, thus forming a heating wire; screen printing Ag paste on the through hole of the ceramic substrate, thus forming an electrode that enables electricity to be conducted between the heating wire and the lead wire; joining, using heat and pressure, a green sheet to a surface of the ceramic substrate on which the heating wire is formed; firing the joined ceramic substrate and green sheet at low temperature, thus manufacturing a substrate body; and brazing the lead wire to the electrode of the substrate body using filler metal while the lead wire is exposed to atmosphere.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

Figure 1:
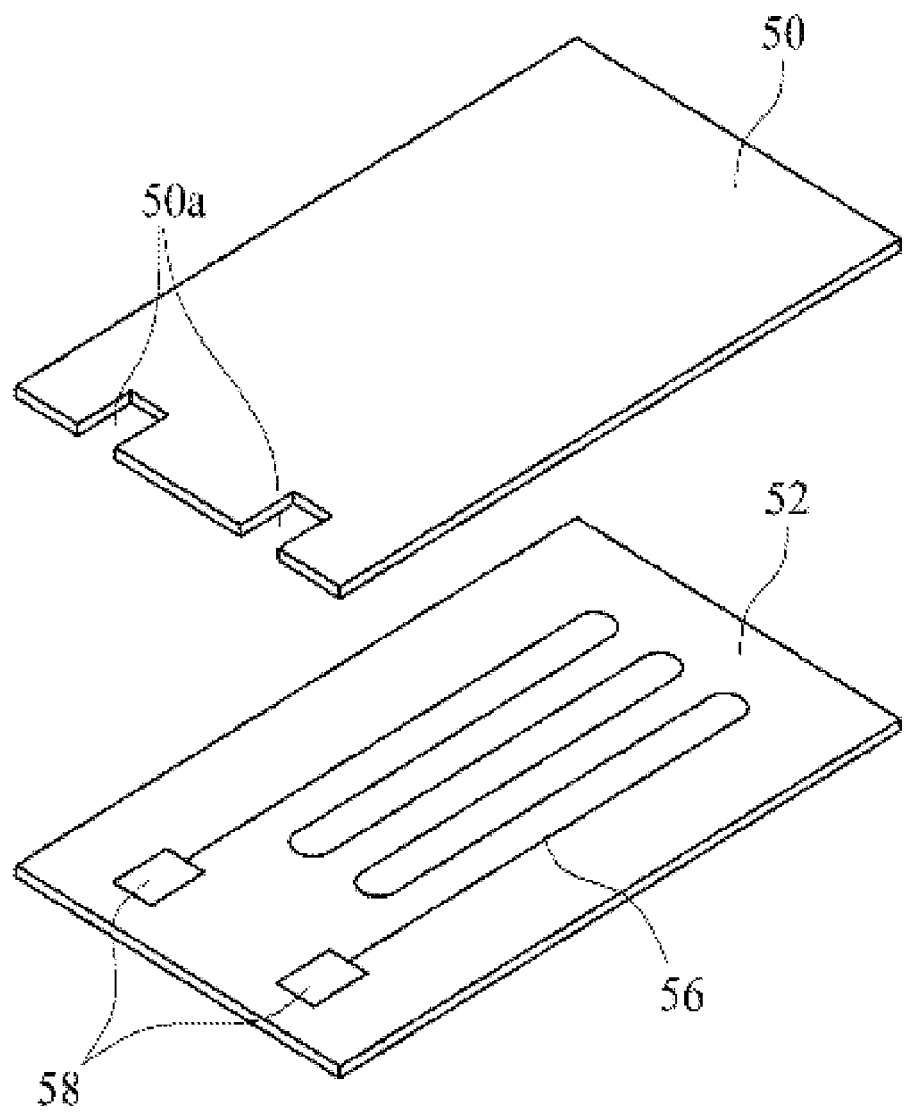
FIG. 1 is a perspective view showing the state in which cut parts and a heating wire are formed, respectively, on upper and lower green sheets in a conventional manufacturing method for a ceramic heater.
Figure 2:
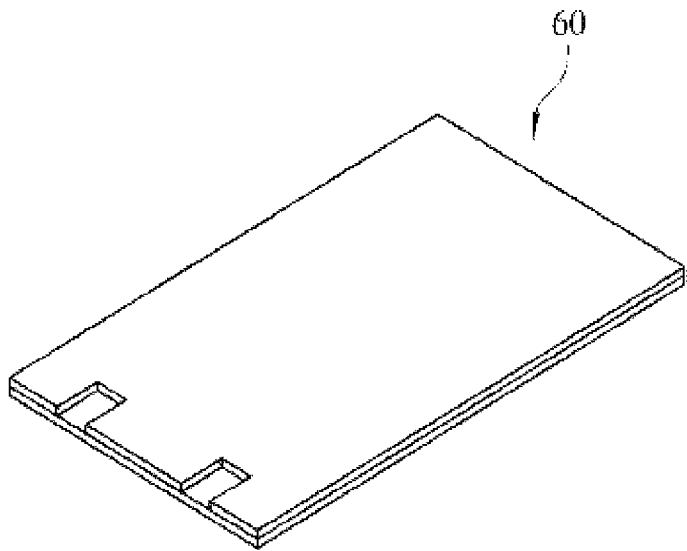
FIG. 2 is a perspective view showing a substrate body that is finished using a firing process of the conventional manufacturing method for the ceramic heater.
Figure 3:
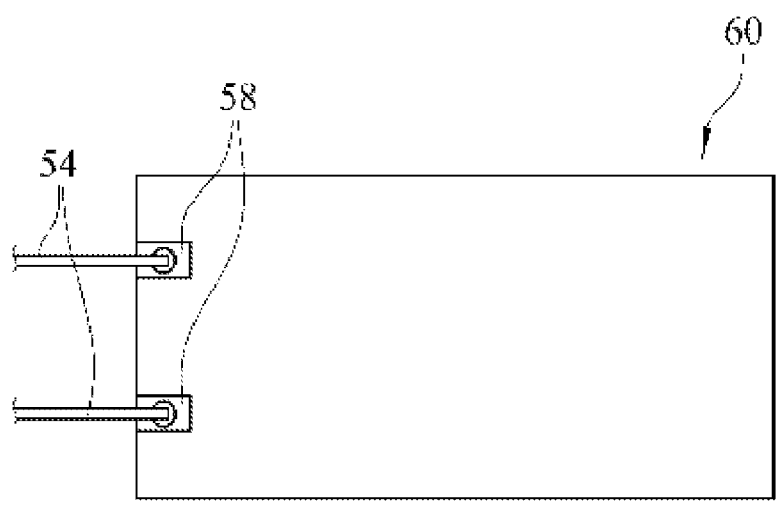
FIG. 3 is a plan view showing the state in which lead wires are coupled to electrodes in the conventional manufacturing method for the ceramic heater.
Figure 4:
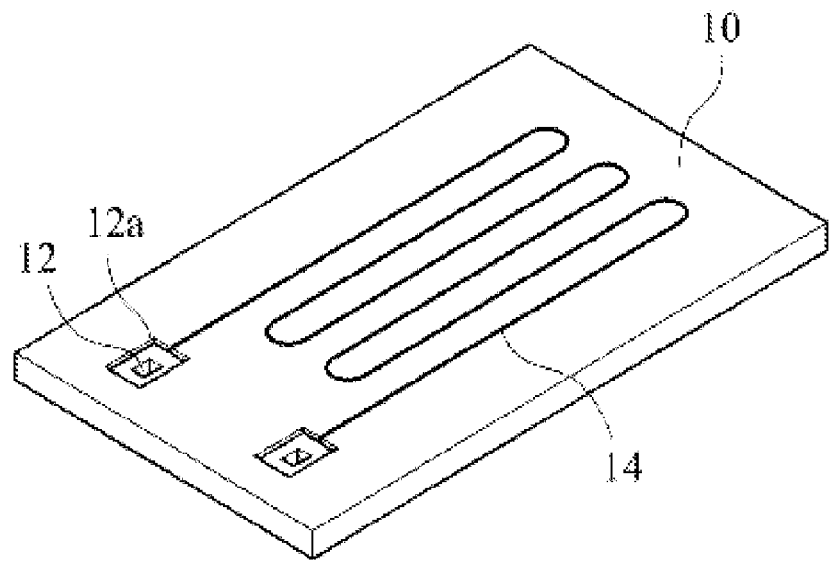
FIG. 4 is a perspective view showing the state in which through holes and a heating wire are formed in a ceramic substrate in a manufacturing method for a ceramic heater according to the present invention.
Figure 5:
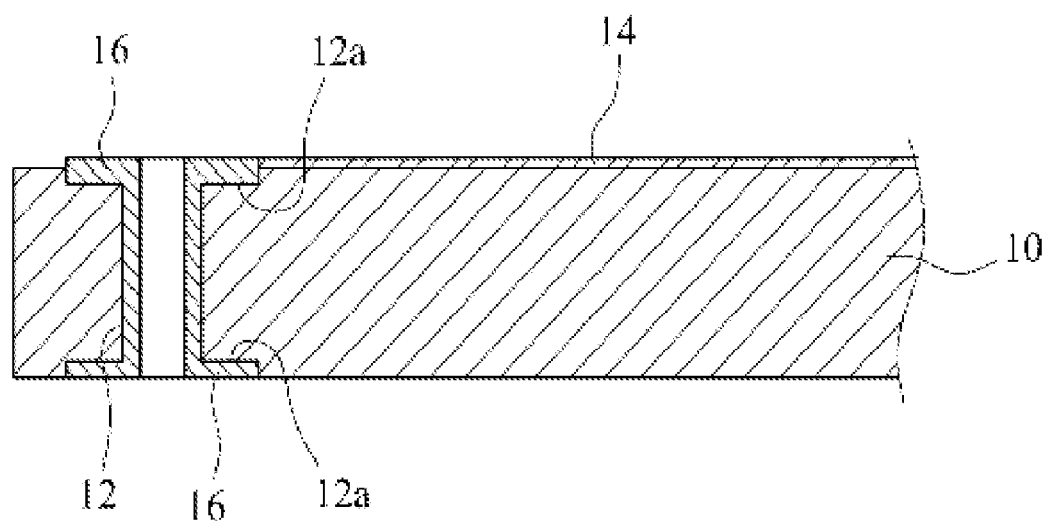
FIG. 5 is a partial sectional view cut along the through hole to illustrate the formation of an electrode in the manufacturing method for the ceramic heater according to the present invention.
Figure 6:
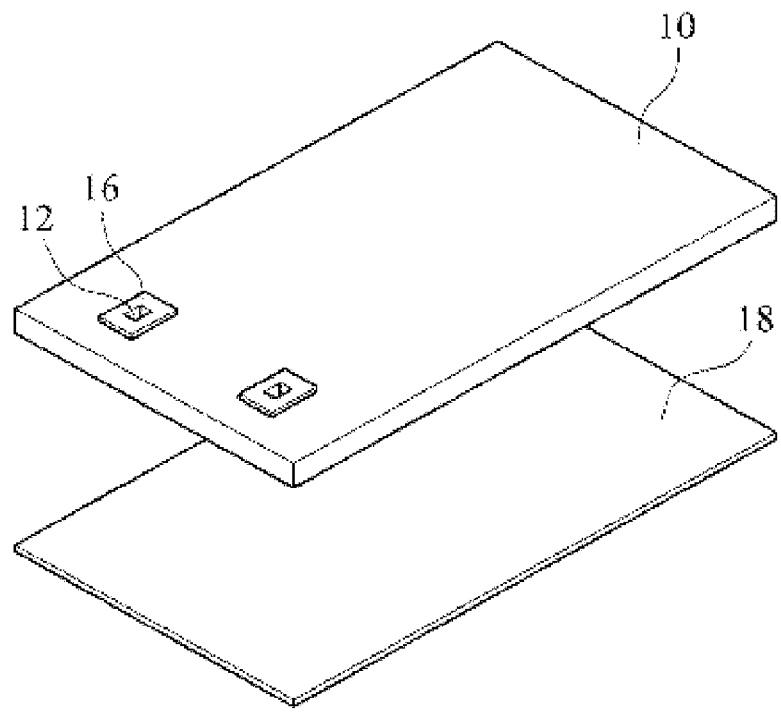
FIG. 6 is a perspective view showing a process of attaching the ceramic substrate to a green sheet in the manufacturing method for the ceramic heater according to the present invention.
Figure 7:
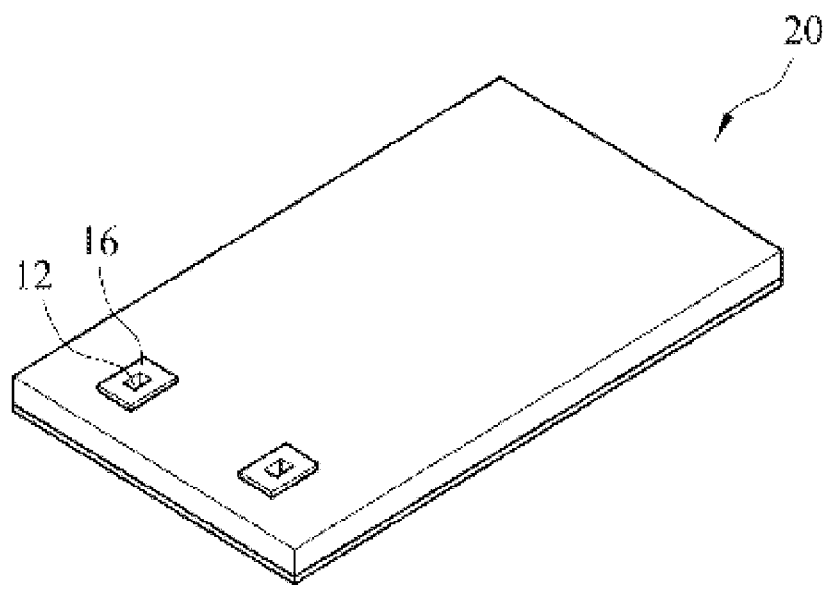
FIG. 7 is a perspective view showing a substrate body that is finished using a firing process of the manufacturing method for the ceramic heater according to the present invention.
Figure 8:
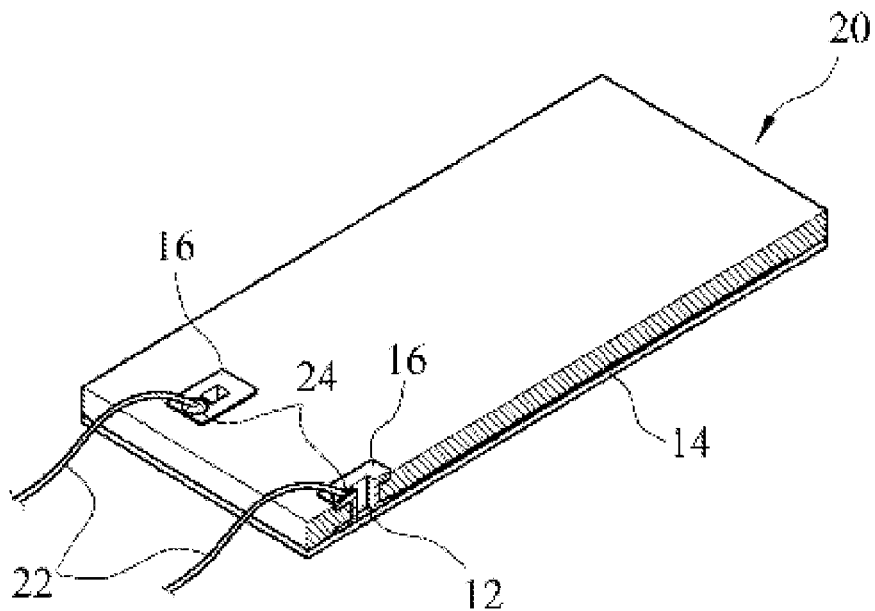
FIG. 8 is a view cut along the through hole to illustrate the state in which lead wires are coupled to electrodes in the manufacturing method for the ceramic heater according to the present invention.

Hereinafter, the embodiment of the present invention will be described in detail with reference to the accompanying drawings.

As shown in the drawings, a manufacturing method for a ceramic heater according to the present invention includes a first step of manufacturing a ceramic substrate 10 of a proper size and forming through holes 12 in the ceramic substrate 10, a second step of forming a heating wire 14 on a surface of the ceramic substrate 10, a third step of screen printing Ag paste on the through holes 12 to form conductive electrodes 16, a fourth step of attaching a separate green sheet 18 to the surface of the ceramic substrate 10 on which the heating wire 14 is formed, a fifth step of firing the two attached sheets to manufacture a substrate body 20, and a sixth step of brazing lead wires 22 to the electrodes 16 of the manufactured substrate body 20.

At the first step of manufacturing the ceramic substrate 10, materials having a superior insulating property such as aluminum oxide ($Al_2O_3$) or silicone oxide ($SiO_2$) are mixed with each other in a proper ratio, thus manufacturing a ceramic slurry. The manufactured ceramic slurry is made into the green sheet 18 which is thin and soft, using a doctor blade process. Thereafter, the green sheet 18 is cut into the size of the substrate body 20 which is to be formed.

Subsequently, the cut green sheet 18 undergoes a firing process, thus finishing a sintered main ceramic substrate 10. The conductive through holes 12 for power connection are formed in the finished ceramic substrate 10. As will be described below, the through holes 12 are electrically connected to the lead wires 22, thus reliably supplying power to the heating wire 14, and are formed through an end of the ceramic substrate 10 in a thickness direction thereof. Here, the through holes 12 may be formed to have various shapes.

Further, a portion around an inlet of an upper or lower surface of each through hole 12 in the ceramic substrate 10 is formed concave with respect to the surface, so that a separate stepped part 12a is formed to be lower than the surface. In this case, the stepped part 12a is provided to more easily form each electrode 16 that enables reliable electric connection with the lead wire 22 as well as the heating wire 14. That is, even if the process of forming the stepped part 12a around the through hole 12 when the ceramic substrate 10 is manufactured is not included, it is possible to form the electrode 16 for the connection with the lead wire 22. However, the process of forming the stepped part 12a may be added to aid in forming the electrode 16 around the through hole 12.

The process of forming the heating wire 14 at the second step screen prints paste for low temperature firing on a surface of the ceramic substrate 10, thus manufacturing a pattern of the heating wire 14 that is a heating element.

In this process, the paste for low temperature firing which is printed to form the heating wire 14 uses a mixture obtained by mixing rare-earth elements, for example, ruthenium (Ru) or palladium (Pd), in a proper ratio, and several kinds of additives may be added to the mixture so as to optimize the characteristics of the heater. Further, when the pattern of the heating wire 14 is printed on the ceramic substrate 10, an end of the heating wire 14 must extend to the through hole 12 for the electric connection with the electrode 16 which will be formed later to be reliable. If the stepped part 12a is formed around the through hole 12, the end of the heating wire 14 has only to extend to the stepped part 12a.

The process of forming the electrode 16 at the third step is implemented by screen printing Ag paste around the through hole 12 formed in the ceramic substrate 10. Here, the Ag paste is sufficiently applied to the surrounding of the inlet of the through hole 12, the inner circumference of the through hole 12, and the back of the ceramic substrate 10 on which the heating wire 14 is not formed. Preferably, the Ag paste applied to the back of the ceramic substrate 10 through the through hole 12 is spread over a wide area around the inlet of the through hole 12, which is formed on the back of the ceramic substrate 10, thus ensuring the connection area with the lead wire 22 to be reliable. That is, the electrode 16 which is formed by printing Ag paste on the ceramic substrate 10 enables a reliable electric application between the heating wire 14 and the lead wire 22.

In this case, since the stepped parts 12a formed around the inlets of both sides of each through hole 12 may confine the Ag paste applied to form the electrode 16 within a predetermined shape of space, the application of electricity between the heating wire 14 and the electrode 16 can be more reliably ensured after the sintering process has been performed.

The attaching process of the green sheet 18 is conducted at the fourth step as follows. That is, after the ceramic substrate 10 on which the heating wire 14 and the electrodes 16 have been printed is turned upside down, the separate green sheet 18 is placed under the ceramic substrate 10, and the ceramic substrate 10 is heated and pressed down. In this process, the surface of the ceramic substrate 10 on which the heating wire 14 is formed may be firmly joined to the surface of the green sheet 18.

In this case, if the green sheet 18 joined to the ceramic substrate 10 is manufactured using powder that has a high degree of purity and a nano size, the green sheet 18 may have high resistance to thermal shock and superior adhesive force relative to the ceramic substrate 10. Thus, this can comply with international insulation standards. Further, if the substrate body 20 is manufactured by joining the ceramic substrate 10 to the green sheet 18 so that the heating wire 14 printed on the ceramic substrate 10 is placed between the ceramic substrate 10 and the green sheet 18, a double adhesion structure satisfying international insulation standards can be achieved.

Further, the thickness of the green sheet 18 is set to be less than that of the ceramic substrate 10. Thus, if the green sheet 18 and the ceramic substrate 10 are manufactured into the substrate body 20 by a final firing process and thereafter the substrate body 20 is mounted to face an object which is to be heated, a heat source emitting heat via the heating wire 14 can heat the object within a shorter period of time through the green sheet 18 that is relatively thinner than the ceramic substrate 10.

At the fifth step, the process of firing the two sheets 10 and 18 that were joined together by heat and pressure to manufacture the substrate body 20 is performed under the low temperature firing condition of about 1000° C. This is because the heating wire 14 formed on the surface of the ceramic substrate 10 by screen printing is replaced by the low temperature firing paste comprising the rare-earth element.

At the sixth step, the brazing process for attaching the lead wire 22 to the substrate body 20 which is finished by the firing process is implemented by brazing the nickel lead wire 22 using an alloy piece of aluminum and zinc as filler metal for the electrode 16 of the substrate body 20. Particularly, the brazing process is performed under the heating condition of a lower temperature, that is, at about 800° C., while exposed to the atmosphere. Thus, unlike the prior art, the brazing process does not have to be performed in a hydrogen furnace which is isolated from the contact with the atmosphere and sprays the mixture of hydrogen and water, so that the cost of building related equipment can be considerably reduced.

Further, the lead wire 22 going through the firing process may be converted into a state capable of applying electricity to the heating wire 14 through the electrode 16. Particularly, the lead wire 22 may be connected to the electrode 16 which is formed of Ag paste without nickel electroless plating unlike the prior art, thus reducing the number of processes.

Moreover, if the lead wire 22 is connected to the electrode 16 using the alloy of aluminum and zinc, sufficient coupling strength of about 7 kgf or more can be obtained at a connection part 24 between the electrode 16 and the lead wire 22, so that sufficient durability of the substrate body 20 is ensured.

Therefore, the manufacturing method for the ceramic heater according to the present invention screen prints the heating wire 14 on the surface of the pre-sintered ceramic substrate 10 using the low temperature firing paste comprising the rare-earth element, attaches the green sheet 18 to the ceramic substrate 10, and sinters the two sheets 10 and 18 under the low temperature firing condition, so that the ceramic heater having high resistance to thermal shock and high adhesive force may be manufactured. Particularly in the brazing process, work for connecting the electrode 16 to the lead wire 22 may be performed under the low temperature environment that is exposed to the atmosphere, so that the expense required to build related equipment can be considerably reduced.

Further, according to the present invention, the through holes 12 are formed in the ceramic substrate 10 to make the electric connection with the printed heating wire 14, and the Ag paste is printed on the through holes 12, thus forming the electrodes 16. Thereby, the nickel electroless plating is not required for the electrodes 16 when they are coupled with the lead wires 22 by brazing. Further, since an alloy of aluminum and zinc is used as filler metal, the sufficient connection strength of about 7 kgf or more can be obtained at the connection part 24 between each electrode 16 and each lead wire 22, and durability proper for the substrate body 20 can be obtained.

Particularly, according to the present invention, the separate green sheet 18 having high resistance to thermal shock is used to improve the ability to make close contact with the pre-sintered ceramic substrate 10, and the green sheet 18 is made of powder that has a high degree of purity and nano size, thus achieving durability for the substrate body 20, and realizing a sintering mechanism capable of minimizing the growth of grain during the firing process. Further, the ceramic substrate body 20 of the present invention can achieve a double adhesion structure wherein the heating wire 14 is located between the pre-sintered ceramic substrate 10 and the green sheet 18, thus satisfying international insulation standards for the heater.

Figure 9:
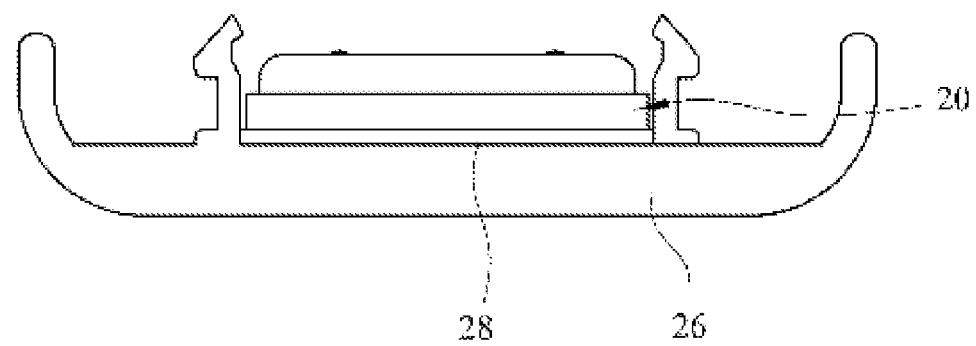
FIG. 9 is a view showing the assembled state of the ceramic heater manufactured according to the present invention.

Further, as shown in FIG. 9, when the substrate body 20 manufactured by the above process is attached to a heating plate 26 of an electric heating device such as an iron using a silicone adhesive 28, the green sheet 18 allows the sintered surface to make direct contact with the heating plate 26, so that the heat source emitted by the heating wire 14 can be transmitted to the object which is to be heated within a shorter period of time, when electricity is applied.

As described above, the present invention provides a manufacturing method for a ceramic heater, in which a heating wire made of a rare-earth element capable of low temperature firing is screen printed on a surface of a ceramic substrate manufactured by firing a ceramic material, and silver is screen printed on the ceramic substrate on which the heating wire is printed, thus forming an electrode that corresponds to a terminal, and a green sheet is joined to the printed heating wire by heat and pressure, and the two sheets joined under the low temperature firing condition of about 1000° C. in the atmosphere and the heating wire between the sheets are integrally sintered, thus allowing the ceramic heater having superior physical properties, that is, high resistance to thermal shock and high adhesive force, to be more easily manufactured.

The present invention provides a manufacturing method for a ceramic heater, in which a lead wire may be connected to a silver electrode without nickel electroless plating, and the silver electrode and the nickel lead wire are brazed using filler metal comprising an alloy of aluminum and zinc, so that sufficient joining strength of 7 kgf or more can be obtained, and the brazing process can be performed under the low temperature condition of about 800° C. while directly exposed to the atmosphere.

Further, the present invention provides a manufacturing method for a ceramic heater, in which adhesive force between a green sheet and a pre-sintered sheet can be further improved using the green sheet that is resistant to thermal shock, and nano-sized powder having a high degree of purity is used, thus increasing the durability of the heater and achieving a sintering mechanism that can minimize the growth of grain during the firing process.

Furthermore, the present invention provides a manufacturing method for a ceramic heater, which provides a double adhesion structure wherein a heating wire is located between a pre-sintered sheet and a green sheet, thus satisfying international insulation standards.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A manufacturing method for a ceramic heater, comprising:
    a) manufacturing a sintered ceramic substrate using a ceramic material, and forming a conductive through hole in the sintered ceramic substrate;
    b) screen printing low temperature firing paste on the sintered ceramic substrate, thus forming a heating wire;
    c) screen printing Ag paste on the through hole, thus forming an electrode;

d) joining, using heat and pressure, a green sheet to a surface of the sintered ceramic substrate on which the heating wire is formed;

e) firing the joined ceramic substrate and green sheet at low temperature, thus manufacturing a substrate body; and f) brazing the lead wire to the electrode of the substrate body using filler metal while the lead wire is exposed to atmosphere.

2. The manufacturing method as set forth in claim 1, wherein a) further comprises forming a concave stepped part around an inlet of the through hole.

3. The manufacturing method as set forth in claim 2, wherein the screen printing of the Ag paste at c) is performed on the stepped part.

4. The manufacturing method as set forth in claim 1, wherein at b), the low temperature firing paste comprises a rare-earth element.

5. The manufacturing method as set forth in claim 4, wherein the rare-earth element comprises ruthenium or palladium.

6. The manufacturing method as set forth in claim 1, wherein the screen printing of the Ag paste at c) is performed over an area including the inlet of the through hole located on each of opposite surfaces of the ceramic substrate and an inner circumference of the through hole.

7. The manufacturing method as set forth in claim 1, wherein at d), the green sheet is manufactured to be thinner than the sintered ceramic substrate.

8. The manufacturing method as set forth in claim 1, wherein at e), the low temperature firing is performed under a firing condition of 1000° C.

9. The manufacturing method as set forth in claim 1, wherein at f), the brazing is performed under a heating condition of 800° C., and the filler metal used for the brazing comprises an alloy of aluminum and zinc.

* * * * *